United States Patent [19]
Klusener et al.

[11] Patent Number: 5,292,700
[45] Date of Patent: Mar. 8, 1994

[54] POLYMERIZATION CATALYST

[75] Inventors: Peter A. A. Klusener; Johannes J. M. Snel; Hans A. Stil, all of Amsterdam, Netherlands

[73] Assignee: Shell Oil Company, Houston, Tex.

[21] Appl. No.: 8,381

[22] Filed: Jan. 25, 1993

Related U.S. Application Data

[62] Division of Ser. No. 774,942, Oct. 11, 1991, Pat. No. 5,218,084

[30] Foreign Application Priority Data

Dec. 11, 1990 [NL] Netherlands ......................... 9002719

[51] Int. Cl.$^5$ .............................................. B01J 31/04
[52] U.S. Cl. ................................... 502/167; 502/162; 502/170
[58] Field of Search ........................ 502/167, 162, 170

[56] References Cited

U.S. PATENT DOCUMENTS 4,786,714 11/1988 Drent .............................. 502/162 X
4,859,764 8/1989 Drent et al. ...................... 502/167 X

FOREIGN PATENT DOCUMENTS 0259914 3/1988 European Pat. Off. .

Primary Examiner—Patrick P. Garvin
Attorney, Agent, or Firm—James O. Okorafor

[57] ABSTRACT

An improved process for the production of linear alternating polymers of carbon monoxide and at least one ethylenically unsaturated hydrocarbon, preferably propylene, includes an aromatic amine in the catalyst composition formed from a palladium salt, the anion of a strong non-hydrohalogenic acid and a bidentate ligand of phosphorus. The presence of the aromatic amine reduces the proportion of 3-alkyl-2,5-furandiyl moieties present in the polymer chain.

9 Claims, No Drawings

POLYMERIZATION CATALYST

This is a division, of application Ser. No. 07/774,942, filed Oct. 11, 1991 and now U.S. Pat. No. 5,218,084.

FIELD OF THE INVENTION

This invention relates to an improved process for the production of a linear alternating copolymer of carbon monoxide. More particularly, the invention relates to a process of producing a linear alternating polymer of carbon monoxide and propylene having a relatively low proportion of 3-alkyl-2,5-furandiyl moieties in the polymeric chain.

BACKGROUND OF THE INVENTION

The production of linear alternating polymers of carbon monoxide and at least one ethylenically unsaturated hydrocarbon is known in the art. Such a process is typically conducted in the presence of a catalyst composition formed from a compound of a Group VIII metal, particularly a salt of palladium, the anion of a strong non-hydrohalogenic acid and a bidentate ligand, often a bidentate ligand of phosphorus. The polymer products, now known as polyketones or polyketone polymers, are represented by the repeating structure

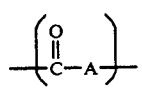  (I)

wherein A is the moiety of at least one ethylenically unsaturated hydrocarbon polymerized through the ethylenic unsaturation thereof. It is known from U.S. Pat. No. 4,786,714 and published European Patent Application 259914 to use as the bidentate ligand of the above catalyst compositions a nitrogen-containing ligand. These references employ, inter alia, 2,2'-bipyridine and (2-pyridyl)diphenylphosphine respectively.

When linear alternating polymers of carbon monoxide and ethylene are prepared, the moieties of the polymer which are derived from carbon monoxide are present as carbonyl groups in a high percentage. If, however, the linear alternating polymer is produced from carbon monoxide and propylene, a larger percentage of the carbon monoxide-derived polymer moieties are present as a 3-alkyl-2,5-furandiyl group. Typically, the degree of furanization, i.e., the extent to which carbon monoxide-derived moieties are found as 3-alkyl-2,5-furandiyl groups rather than as carbonyl groups is as high as 10% and in some cases is as high as 50%. The presence of such furandiyl groups is generally undesirable. These groups are detrimental to the stability of the linear alternating polymer and furthermore reduce the possibility for functional modification of the polymer through chemical reaction at the carbonyl groups. It has been found that if an amine is added to a polymerization product mixture during purification of the linear alternating polymer, the degree of furanization of the purified polymer is somewhat lower than if no amine had been added. However, the post-polymerization addition of amine does not reduce the presence of 3-alkyl-2,5-furandiyl moieties to an acceptable level. It would be of advantage to provide an improved process of producing linear alternating polymers of carbon monoxide and propylene wherein a reduced formation of 3-alkyl-2,5-furandiyl moieties in the polymer chain is observed.

SUMMARY OF THE INVENTION

The present invention provides an improved process for the production of linear alternating polymers of propylene and carbon monoxide. More particularly, the invention provides an improved process for production of a copolymer of carbon monoxide and propylene wherein a relatively large proportion of carbon monoxide-derived moieties are present as carbonyl groups and a relatively low percentage of the moieties are present as 3-alkyl-2 5-furandiyl groups.

DESCRIPTION OF THE INVENTION

The improved process of the invention comprises the production of copolymers of carbon monoxide and propylene as well as terpolymers of carbon monoxide, propylene and another α-olefin of up to 14 carbon atoms inclusive. In a preferred modification, however, copolymers of carbon monoxide and propylene are produced by contacting carbon monoxide and propylene under polymerization conditions in the presence of a diphosphine-containing catalyst composition of conventional character to which an aromatic amine has been added. The process results in the efficient production of linear alternating copolymer of a reduced degree of furanization. A relatively high proportion of the polymeric moieties derived from carbon monoxide are found as carbonyl groups rather than as 3-alkyl-2,5-furandiyl groups.

The linear alternating carbon monoxide/propylene copolymers produced according to the process of the invention are generally of the repeating structure

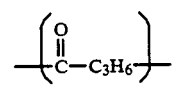  (II)

wherein the propylene moiety is polymerized through the ethylenic unsaturation thereof. Because of the methyl substituent of the propylene unsaturated linkage, the $C_3H_6$ units of the above formula II may occur as

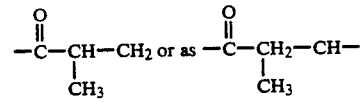

units and the polymer contains a random mixture of both types of unit. Occasionally, however, the units exist as a derivative of the furan-type structure such as

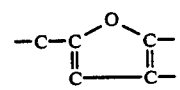  (III)

It is the reduction of the degree of this furanization that the process of the invention is applied. The molar ratio of carbon monoxide to propylene which is contacted with catalyst composition under polymerization conditions is not critical and molar ratios from about 10:1 to about 1:10 are satisfactory. Molar ratios of carbon monoxide to propylene from about 5:1 to about 1:5 are preferred.

The catalyst compositions employed in the process of the invention are formed from a salt of palladium, the anion of a strong non-hydrohalogenic acid and a bidentate ligand of phosphorus. The salt of palladium is preferably a palladium carboxylate and palladium acetate, palladium propionate, palladium butyrate and palladium hexanoate are satisfactory. Particularly preferred as the palladium salt is palladium acetate. The anion precursor of the catalyst composition is the anion of a non-hydrohalogenic acid having a pKa of less than 4 and preferably the acid from which the anion is illustratively derived has a pKa below 2. These acids include inorganic acids such as sulfuric acid and perchloric acid and organic acids including carboxylic acids such as trichloroacetic acid, dichloroacetic acid, difluoroacetic acid and trifluoroacetic acid as well as sulfonic acids such as methanesulfonic acid, trichloromethanesulfonic acid and p-toluenesulfonic acid. The preferred anions are anions of trifluoroacetic acid and p-toluenesulfonic acid, particularly p-toluenesulfonic acid. The anion is preferably provided as the free acid by alternatively is provided as a metal salt particularly as a non-noble transition metal salt such as the copper or nickel salt. However provided, the quantity of anion to be used is from about 1 mole to about 100 moles of anion per mole of palladium. Preferably the anion is provided in a quantity from about 2 moles to about 50 moles per mole of palladium.

The bidentate phosphine precursor of the catalyst composition is represented by the formula

(IV)

wherein R and R' independently have up to 10 carbon atoms inclusive and are aliphatic or are aromatic. R and R' independently are hydrocarbon groups such as methyl, ethyl, butyl, hexyl, octyl, phenyl, tolyl or xylyl, or are substituted hydrocarbon groups such as 4-chlorophenyl, 3,5-di-chlorophenyl, 2-bromoethyl or 4-chlorobutyl. A useful aromatic R or R' groups is phenyl, but preferred R and R' groups are hydrocarbon aliphatic and more preferably are, independently, alkyl groups of differing carbon number. Phosphine ligands wherein each R is methyl and each R' is n-butyl give especially good results in the process of the invention. The R" groups is aliphatic of up to 10 carbon atoms and preferably has from 2 to 4 carbon atoms in the bridge. Such R" groups are illustrated by 1,2-ethylene, 1,2-propylene, 1,4-butene, 1,3-butene and 2,2,3,3-tetramethyl-1,4-butene. The bidentate phosphine ligand 1,4-bis(methylbutylphosphino)butene is a particularly preferred bidentate phosphine ligand. The bidentate ligand is provided to the catalyst composition in a quantity of from about 0.5 mole to about 2 moles per mole of palladium. Preferred quantities of ligand are from about 0.75 mole to about 1.5 mole per mole of palladium.

It is useful on occasion to include within the catalyst composition an organic oxidizing agent. Suitable oxidizing agents include aliphatic nitrites such as butyl nitrites, aromatic nitro compounds such as nitrobenzene and 2,4-dinitrotoluene, and quinones, both 1,2-quinones and 1,4-quinones. Preferred as oxidizing agent are the 1,4-quinones and 1,4-benzoquinone, 1,4-naphthoquinone and anthraquinone are suitable. The 1,4-benzoquinone is particularly preferred. As stated, the use of an oxidizing agent is optional and none is required. Quantities of oxidizing agent up to about 10,000 moles per mole of palladium are satisfactory. When oxidizing agent is present, amounts of from about 10 moles to about 1,000 moles per mole of palladium are preferred.

The process of the invention is characterized by the presence of a furan-reducing quantity of an aromatic amine within the catalyst composition. While substituted-hydrocarbon aromatic amines containing inert substituents such as bromo or chloro are useful in the process of the invention, the preferred aromatic amines are otherwise hydrocarbon amines of up to 3 aromatic rings inclusive. Aromatic amines of one aromatic ring include pyridine, 2-picoline, 4-picoline, 2,4-lutidine, 2,6-lutidine and collidines such as 2,4,6-collidine, as well as pyridines substituted with other alkyl groups such as 2-propylpyridine and 2-methyl-4- butylpyridine. Suitable aromatic hydrocarbon amines having more than one aromatic ring are quinoline, 2-methyl-quinoline and 2,4-dimethylquinoline, as well as the isoquinolines and the dibenzopyridines. The preferred aromatic amines to be added to the catalyst composition are pyridine, 2-picoline and quinoline. Particularly preferred is pyridine. The quantity of aromatic amine to be added to the catalyst composition prior to polymerization is a furan-reducing quantity, i.e., that quantity which reduces the formation of 3-alkyl-2,5-furandiyl moieties during production of the linear alternating polymer. Such quantities are from about 0.25 mole to about 25 moles of aromatic amine per mole of the anion precursor. Preferred quantities of amine are from about 0.5 mole to about 10 moles per mole of anion.

The carbon monoxide and propylene reactants are contacted in the presence of a catalytic quantity of the catalyst composition, formed by mixing the catalyst composition components, under polymerization conditions in the presence of a polar reaction diluent. The catalytic quantity of catalyst composition to be used is sufficient to provide from about $1 \times 10^{-7}$ mole to about $1 \times 10^{-3}$ mole of palladium per mole of ethylenically unsaturated hydrocarbon reactant. Quantities of catalyst sufficient to provide from about $1 \times 10^{-6}$ mole to about $1 \times 10^{-4}$ mole of palladium per mole of olefinic reactant are preferred. The reaction diluent is a polar diluent in which the reactants and catalyst composition are at least partially soluble. A variety of polar reaction diluents are useful, but preferred diluents are alkanones such as acetone and methyl ethyl ketone, alkanols such as methanol and ethanol, and mixtures thereof. The use of methanol or methanol mixtures as with acetone are preferred. Typical polymerization conditions include a polymerization temperature from about 25° C. to about 150° C., preferably from about 30° C. to about 130° C. Suitable pressures are from about 2 bar to about 150 bar but pressures from about 5 bar to about 100 bar are preferred.

The contacting of reactants and catalyst composition takes place in a suitable reactor and is facilitated by some means of agitation such as shaking or stirring. Subsequent to polymerization, the reaction is terminated as by cooling the reactor and contents and releasing the pressure. The polymer product is typically obtained as a material substantially insoluble in the reaction diluent and is recovered by conventional methods such as filtration or decantation. The polymer is used as recovered or alternatively is purified as by contact with a solvent or extraction agent which is selective for catalyst residues.

The linear alternating polymers are thermoplastic polymers and are useful in applications conventional for thermoplastics. The polyketones are processable by methods known to be useful for thermoplastics, e.g., extrusion, injection molding and thermoforming, into a variety of films, fibers and other shaped articles of established utility. Specific applications are in the production of containers for food and drink or parts and housings for automotive applications. The reduced content of furandiyl moieties in the polymer results in increased polymer stability and better enables functionalization of the polyketone polymer as by reaction with molecular hydrogen to produce polyols or with hydrogen sulfide to produce polythiols.

The invention is further illustrated by the following Comparative Examples (not of the invention) and the following Illustrative Embodiments which should not be regarded as limitations. For each of the polymers produced, the proportion of moieties derived from carbon monoxide which were present as 3-alkyl-2,5-furandiyl groups was determined by the use of $^{13}C$-NMR.

COMPARATIVE EXAMPLE I

A copolymer of carbon monoxide and ethylene was produced by purging the air from a 100 ml autoclave, which was equipped with a mechanical stirrer, with nitrogen and adding a catalyst composition solution consisting of 40 ml methanol, 0.05 mmol palladium acetate, 0.6 mmol 2,2,3,3-tetramethyl-1,4-bis[di(4-chlorophenyl)-phosphino]butane and 0.1 mmol p-toluenesulfonic acid. An equimolar mixture of carbon monoxide and ethylene was charged to the autoclave until a pressure of 40 bar had been reached and the resulting mixture was heated to 90° C. During polymerization, additional equimolar mixture was continuously added to maintain a constant pressure. After 1.5 hours the polymerization was terminated by cooling the reactor and contents and releasing the pressure. The polymer was recovered by filtration, washed with methanol and dried. The yield of polymer was 1.9 g, produced at a rate of 240 g of copolymer/g Pd hr. The degree of furanization was less than 5%.

COMPARATIVE EXAMPLE II

A copolymer of carbon monoxide and propylene was produced by the procedure of Comparative Example I except that after the catalyst composition solution was charged to the autoclave, 10.5 g of propylene were added and the autoclave and contents heated to 60° C. Carbon monoxide was then added until a pressure of 40 bar was reached. During the resulting polymerization, the pressure was kept constant by the addition of carbon monoxide. After 17.2 hours the polymerization was terminated and the polymer was isolated by evaporation of the product mixture. The yield of copolymer was 1.0 g, obtained at a polymerization rate of 10 g of copolymer/g Pd hr. The degree of furanization was greater than 30%.

COMPARATIVE EXAMPLE III

A carbon monoxide/propylene copolymer was produced by purging the air from a mechanically stirred autoclave of 300 ml capacity with nitrogen and adding catalyst composition solution consisting of 120 ml methanol, 0.1 mmol palladium acetate, 0.11 mmol 1,3-bis(diphenylphosphino)propane and 0.2 mmol p-toluenesulfonic acid. After 26 g of propylene were added, the autoclave and contents were heated to 60° C. and carbon monoxide was added to give a pressure of 40 bar. During the resulting polymerization, the pressure was kept constant by continuous addition of carbon monoxide. After 1 hour, the polymerization was terminated by cooling the autoclave and contents and releasing the pressure. The polymer was then recovered by evaporation of the product mixture. The yield of polymer was 6.9 g, obtained at a rate of 660 g of polymer. The degree of furanization was 24%.

COMPARATIVE EXAMPLE IV

A copolymer of carbon monoxide and propylene was obtained by a procedure substantially similar to the procedure of Comparative Example II except that the diphosphine was 0.055 mmol of 1,4-bis(diphenylphosphino)butane, 10.8 g of propylene were added instead of 10.5 g, and the reaction time was 17 hours instead of 17.2 hours. The yield of polymer was 9.4 g, obtained at a rate of 100 g of copolymer/g Pd hr. The degree of furanization was 25%.

COMPARATIVE EXAMPLE V

A carbon monoxide/propylene copolymer was obtained by a procedure substantially similar to that of Comparative Example II except that the diphosphine was 0.55 mmol of 1,4-bis(dibutylphosphino)butane, the reaction temperature was 80° C. instead of 60° C., the reaction time was 1 hour instead of 17.2 hours and 12.1 g of propylene was charged to the reactor instead of 10.5 g. The yield of copolymer was 3.1 g, produced at the rate of 580 g of copolymer/g Pd hr. The degree of furanization was 25%.

COMPARATIVE EXAMPLE VI

A copolymer of carbon monoxide and propylene was produced by a process substantially similar to that of Comparative Example III except that the diphosphine was 0.11 mmol of 1,4-bis(methylbutylphosphino)butane, 27 g of propylene was charged to the reactor instead of 26 g, the reaction temperature was 80° C. instead of 60° C. and the reaction time was 3 hours instead of 1 hour. The yield of copolymer was 22.0 g, obtained at a rate of 690 g of copolymer/g Pd hr. The degree of furanization was 26%.

COMPARATIVE EXAMPLE VII

A copolymer of carbon monoxide and propylene was produced by a procedure substantially similar to that of Comparative Example III except that the catalyst composition solution contained 0.05 mmol of palladium acetate instead of 0.10 mmol and 0.055 mmol of the diphosphine instead of 0.11 mmol, 27 g of propylene was charged to the autoclave instead of 26 g, and the reaction temperature was 70° C. instead of 60° C. The yield of copolymer was 6.4 g, obtained at a rate of 1190 g of copolymer/g Pd hr. The degree of furanization was 15%.

ILLUSTRATIVE EMBODIMENT I

A copolymer of carbon monoxide and propylene was obtained by a procedure substantially similar to that of Comparative Example III except that the catalyst composition solution additionally contained 0.24 mmol of pyridine and 25 g of propylene were charged to the reactor instead of 26 g. The yield of copolymer was 2.3 g, obtained at a rate of 220 g of copolymer/g Pd hr. The degree of furanization was 1%.

ILLUSTRATIVE EMBODIMENT II

A carbon monoxide/propylene copolymer was produced by a procedure substantially similar to Comparative Example III except that the catalyst composition contained 1,4-bis(diphenylphosphino)butane instead of 1,3-bis(diphenylphosphino)propane and additionally contained 0.24 mmol of pyridine, 27 g of propylene were charged to the reactor instead of 26 g and the reaction temperature was 80° C. instead of 60° C. The yield of copolymer was 2.0 g obtained at a rate of 190 g of copolymer/g Pd hr. The degree of furanization was 5%.

ILLUSTRATIVE EMBODIMENT III

A carbon monoxide/propylene copolymer was produced by a procedure substantially similar to that of Illustrative Embodiment II except that 30 g of propylene were charged to the autoclave instead of 26 g. The yield of copolymer was 6.9 g produced at the rate of 650 g of copolymer/g Pd hr. The rate of furanization was 4%.

ILLUSTRATIVE EMBODIMENT IV

A carbon monoxide/propylene copolymer was produced by a procedure substantially similar to that of Illustrative Embodiment II except that 0.12 mmol of pyridine was added instead of 0.24 mmol and 23 g of propylene were charged to the reactor instead of 26 g. The yield of copolymer was 7.5 g, produced at the rate of 710 g of copolymer/g Pd hr. The degree of furanization was 3%.

ILLUSTRATIVE EMBODIMENT V

A copolymer of carbon monoxide and propylene was produced by a procedure substantially similar to that of Illustrative Embodiment II except that 0.48 mmol of pyridine was used. The yield of copolymer was 5.7 g obtained at a rate of 540 g of copolymer/g Pd hr. The degree of furanization was 3%.

ILLUSTRATIVE EMBODIMENT VI

A copolymer of carbon monoxide and propylene was produced by a procedure substantially similar to that of Comparative Example III except the catalyst composition solution contained 120 ml methanol, 0.05 mmol palladium acetate, 0.055 mmol 1,4-bis(methylbutylphosphino)butane, 0.1 mmol p-toluenesulfonic acid and 0.12 mmol pyridine, 28 g of propylene were charged to the reactor instead of 26 g and the reaction temperature was 80° C. instead of 60° C. The yield of copolymer was 3.3 g, obtained at a rate of 600 g of copolymer/g Pd hr. The degree of furanization was 1%.

ILLUSTRATIVE EMBODIMENT VII

A carbon monoxide/propylene copolymer was produced by a procedure substantially similar to that of Comparative Example III except that the diphosphine was 1,4-bis(methylbutylphosphino)butane and the catalyst composition solution additionally contained 0.24 mmol of pyridine, 27 g of propylene were charged to the autoclave instead of 26 g and the reaction temperature was 70° C. instead of 60° C. The yield of the copolymer was 9.7 g, produced at the rate of 440 g of copolymer/g Pd hr. The degree of furanization was 1%.

ILLUSTRATIVE EMBODIMENT VIII

A carbon monoxide/propylene copolymer was produced by the procedure of Comparative Example III except that the catalyst composition solution contained 40 ml acetone, 80 ml methanol, 0.05 mmol palladium acetate, 0.055 mmol 1,4-bis(dibutylphosphino)butane, 0.1 mmol p-toluenesulfonic acid and 0.1 mmol pyridine, 120 ml of propylene was charged to the reactor instead of 26 g, the reaction temperature was 80° C. instead of 60° C. and the reaction time was 1.4 hour instead of 1 hour. The yield of copolymer was 5.6 g, obtained at the rate of 770 g of copolymer/g Pd hr. The degree of furanization was less than 0.1%.

ILLUSTRATIVE EMBODIMENT IX

A copolymer of carbon monoxide and propylene was produced by the procedure of Comparative Example III except that the catalyst composition solution contained 40 ml acetone, 80 ml methanol, 0.05 mmol palladium acetate, 0.055 mmol 1,4-bis(diphenylphosphino)butane, 0.1 mmol p-toluenesulfonic acid and 0 11 mmol quinoline, 25 ml of propylene were charged to the reactor instead of 26 g, the reaction temperature was 80° C. instead of 60° C. and the reaction time was 2.1 hours instead of 1 hour. The yield of copolymer was 2.1 g, produced at the rate of 180 g of copolymer/g Pd hr. The degree of furanization was 0.6%.

ILLUSTRATIVE EMBODIMENT X

A copolymer of carbon monoxide and propylene was produced by a procedure similar to that of Comparative Example II except that the diphosphine was 1,4-bis(dibutylphosphino)propane, 25 ml of propylene were charged to the reactor instead of 10.5 g, the reaction temperature was 80° C. instead of 60° C. and the reaction time was 1.9 hour instead of 17.2 hours. The yield of copolymer was 1.7 g, produced at the rate of 160 g of copolymer/g Pd hr. The degree of furanization was 0.8%.

What is claimed is:

1. In a catalyst composition formed from a salt of palladium, the anion of a non-hydrohalogenic acid having a pKa below 4, a bidentate phosphine ligand, the improvement of additionally providing to the catalyst composition an aromatic amine selected from the group consisting of pyridine, alkyl-substituted pyridine, quinoline and alkyl-substituted quinoline.

2. The composition of claim 1 wherein the ligand is of the formula

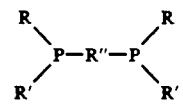

wherein R and R' independently are aliphatic or aromatic of up to 10 carbon atoms inclusive and R" is aliphatic of up to 10 carbon atoms inclusive with from 2 to 4 carbon atoms in the bridge.

3. The composition of claim 2 wherein the palladium salt is palladium acetate.

4. The composition of claim 3 wherein R and R' are alkyl and R" is 1,4-butylene.

5. The composition of claim 4 wherein the anion is the anion of trifluoroacetic acid or p-toluenesulfonic acid.

6. The composition of claim 5 wherein the amine is pyridine, 2-picoline or quinoline.

7. The composition of claim 6 wherein the ligand is 1,4-bis(methylbutylphosphino)butane.

8. The composition of claim 7 wherein the amine is pyridine.

9. The composition of claim 8 wherein the anion is the anion of p-toluenesulfonic acid.

* * * * *